United States Patent
Oriani

(10) Patent No.: US 8,791,180 B2
(45) Date of Patent: *Jul. 29, 2014

(54) PROCESS FOR PRODUCTION OF A HEAT-STABILIZED ACRYLATE POLYMER

(75) Inventor: Steven R Oriani, Landenberg, PA (US)

(73) Assignee: E I du Pont de Nemours and Company, Wilmington, DE (US)

(*) Notice: Subject to any disclaimer, the term of this patent is extended or adjusted under 35 U.S.C. 154(b) by 121 days.

This patent is subject to a terminal disclaimer.

(21) Appl. No.: 13/529,477

(22) Filed: Jun. 21, 2012

(65) Prior Publication Data

US 2012/0329926 A1    Dec. 27, 2012

Related U.S. Application Data

(60) Provisional application No. 61/499,580, filed on Jun. 21, 2011.

(51) Int. Cl.
C08L 77/02 (2006.01)
C08K 5/18 (2006.01)
C08L 77/10 (2006.01)

(52) U.S. Cl.
USPC ............ 524/106; 524/255; 525/183; 525/186

(58) Field of Classification Search
CPC ............ C08L 33/08; C08L 77/02; C08K 5/14
USPC ............................. 524/106, 255; 525/186, 183
See application file for complete search history.

(56) References Cited

U.S. PATENT DOCUMENTS

| | | | |
|---|---|---|---|
| 3,883,472 A | 5/1975 | Greene et al. | |
| 3,899,378 A | 8/1975 | Wragg et al. | |
| 3,904,588 A | 9/1975 | Greene | |
| 3,965,055 A | 6/1976 | Shichman et al. | |
| 4,174,358 A | 11/1979 | Epstein | |
| 4,275,180 A | 6/1981 | Clarke | |
| 4,310,638 A | 1/1982 | Coran et al. | |
| 4,410,661 A | 10/1983 | Epstein et al. | |
| 4,520,183 A | 5/1985 | Subramanian | |
| 4,694,042 A | 9/1987 | McKee et al. | |
| 5,070,145 A | 12/1991 | Guerdoux | |
| 5,112,908 A | 5/1992 | Epstein | |
| 5,166,278 A | 11/1992 | Rao | |
| 5,591,798 A | 1/1997 | Patel | |
| 5,688,868 A | 11/1997 | Fish, Jr. | |
| 5,688,901 A | 11/1997 | Fisch et al. | |
| 5,777,033 A | 7/1998 | Venkataswamy et al. | |
| 5,866,658 A | 2/1999 | Talkowski | |
| 5,948,503 A | 9/1999 | Yamamoto et al. | |
| 6,133,375 A * | 10/2000 | Betremieux et al. | 525/66 |
| 6,156,849 A | 12/2000 | Moriyama et al. | |
| 7,015,260 B2 | 3/2006 | Meloni | |
| 7,144,938 B1 | 12/2006 | Feinberg et al. | |
| 7,402,631 B2 | 7/2008 | Kubota et al. | |
| 7,544,757 B2 | 6/2009 | Wu et al. | |
| 7,608,216 B2 | 10/2009 | Park et al. | |
| 7,960,477 B2 | 6/2011 | Weber et al. | |
| 8,142,316 B2 | 3/2012 | Goettsch et al. | |
| 2002/0019477 A1 | 2/2002 | Bartz et al. | |
| 2004/0242737 A1 | 12/2004 | Topulos | |
| 2006/0004147 A1 | 1/2006 | Park et al. | |
| 2006/0100368 A1 | 5/2006 | Park | |
| 2007/0004854 A1 | 1/2007 | Wu et al. | |
| 2007/0004855 A1 * | 1/2007 | Wu et al. | 524/556 |
| 2007/0238833 A1 | 10/2007 | Leboeuf et al. | |
| 2007/0265364 A1 | 11/2007 | Oner-Deliomanli et al. | |
| 2008/0132370 A1 | 6/2008 | Goettsch et al. | |
| 2008/0287600 A1 | 11/2008 | Park et al. | |
| 2010/0029821 A1 | 2/2010 | Palmer et al. | |
| 2010/0048821 A1 * | 2/2010 | Weber et al. | 525/222 |
| 2011/0028621 A1 | 2/2011 | Martens et al. | |
| 2012/0328812 A1 | 12/2012 | Oriani | |
| 2012/0328813 A1 | 12/2012 | Oriani | |
| 2012/0329914 A1 | 12/2012 | Oriani | |
| 2012/0329925 A1 | 12/2012 | Oriani | |
| 2012/0329926 A1 | 12/2012 | Oriani | |
| 2012/0329927 A1 | 12/2012 | Oriani | |
| 2012/0329928 A1 | 12/2012 | Oriani | |

FOREIGN PATENT DOCUMENTS

| | | |
|---|---|---|
| DE | 102008038943 A1 | 2/2010 |
| EP | 0432911 A1 | 6/1991 |
| EP | 0667367 A2 | 8/1995 |
| JP | 7090136 A | 4/1995 |
| JP | H10251452 | 9/1998 |
| JP | 2001-191387 | 7/2001 |
| JP | 2009204097 | 10/2009 |
| WO | 9634048 A1 | 10/1996 |

OTHER PUBLICATIONS

Jha et al. "Thermoplastic Elastomeric Blends of Nylon-6/Acrylate Rubber: Influence of Interaction on Mechanical and Dynamic Mechanical Thermal Properties" Rubber Chemistry and Technology vol. 70 (1997) p. 798-814.
Zeon Chemicals L.P. HyTemp® Technical Manual, Rev. Jan. 2009, p. 59-61 (2009).
Zeon Chemicals L.P. HyTemp® Technical Manual, Rev. Jan. 2009, p. 46 (2009).
Unimatec Chemicals Germany Noxtite ACM (basic) Jan. 2007, pp. 56-57.
International Search report for PCT/US2012/043551, Oct. 1, 2012.
International Search Report for PCT/043561 Oct. 1, 2012.

* cited by examiner

*Primary Examiner* — John Uselding

(57) ABSTRACT

Polyamide-reinforced polyacrylate polymer compositions comprising a continuous polyacrylate polymer phase and a discontinuous polyamide phase are produced by a melt mixing process. When crosslinked with peroxide curatives the polyamide-reinforced polyacrylate polymer compositions exhibit enhanced resistance to heat aging compared to carbon black-reinforced polyacrylate polymer compositions.

20 Claims, No Drawings

PROCESS FOR PRODUCTION OF A HEAT-STABILIZED ACRYLATE POLYMER

CROSS REFERENCE TO RELATED APPLICATION

This application claims priority from U.S. Patent Application Ser. No. 61/499,580, filed on Jun. 21, 2011, which is incorporated herein by reference in its entirety.

FIELD OF THE INVENTION

The present invention is directed to peroxide curable amorphous polyacrylate elastomer compositions, processes for producing these compositions, and cured compositions and articles made from such compositions.

BACKGROUND OF THE INVENTION

Polyacrylate elastomers are well-known synthetic rubbers formed by copolymerization of alkyl acrylates. The polyacrylate elastomers may be polyacrylates that contain only copolymerized alkyl acrylate units, for example copolymerized units of methyl acrylate and butyl acrylate. Alternatively, they may be alkyl acrylate copolymers that contain additional copolymerized monomers, such as ethylene, and cure site monomers such as chlorovinyl ether, monomers that contain carboxyl groups, and/or epoxide containing monomers. The raw polymers, also known as gums or gum rubbers, may be cured with a wide variety of curatives, depending on the cure site monomers. Some acrylate elastomers may be cured with metal soaps such as sodium or potassium stearate, in combination with sulfur, a sulfur donor, a tertiary amine or a quaternary amine salt. Epoxides, isocyanates, and polyols may also be used in certain cases. Polyamines, specifically diamines, are effective curatives for polyacrylates comprising amine-reactive cure sites. Of these curatives, diamines or diamine generators are often preferred because the cured polymers produced exhibit enhanced heat aging resistance. Diamine curable polyacrylates generally contain at least 0.3 mol % of an amine reactive cure site monomer, such as an anhydride, acid-anhydride, half ester anhydride, or epoxide. Some types of polyacrylate elastomers, however, are peroxide curable, even when no cure site monomer is present. Polyacrylate elastomers that have been cured using a diamine cure system generally exhibit heat aging resistance that is superior to that of polyacrylate elastomers that have been cured with other available cure systems. However, diamine cured compounds require a post cure step, for example post cure for four hours at 175° C., to develop optimal properties. Peroxide cured compounds advantageously can be used without a post cure or at most require a short post cure of about 30 minutes at 175° C.

Polyacrylate elastomers comprising only polymerized units of acrylate monomers generally exhibit a poor cure response to peroxide. This is because contiguous polymerized units of acrylate monomers may lead to significant chain scission in the presence of free radicals, so the net increase in crosslink density is low. To enable peroxide curing, the acrylate elastomer must either comprise an unsaturated pendant group which functions as a cure site monomer, or the acrylate elastomer must comprise at least 50 mol % copolymerized units of ethylene. Copolymerized ethylene monomer units act as spacers between polymerized acrylate monomer units to limit β-scission.

Examples of commercially available acrylate elastomers include Vamac® ethylene acrylic elastomers manufactured by E.I. du Pont de Nemours and Company and HyTemp® elastomers, manufactured by Zeon Chemicals L.P.

In view of their excellent oil resistance, polyacrylate elastomers are widely used in the manufacture of automotive parts, such as automotive boots, ignition cable jacketing and hoses.

Resistance to heat aging is a particularly desirable property in rubber parts that are used in under the hood automotive applications, e.g. hoses, gaskets, and seals. Because such parts may be exposed to temperatures in excess of 180° C. for periods of several hours on a regular basis, degradation of physical properties through oxidative embrittlement can occur. In polyacrylate rubbers, a reduction in extensibility and an increase in hardness and modulus of the polyacrylate rubber article often result. Such effects are disclosed for example in Zeon Chemicals L.P., HyTemp® Technical Manual, Rev. 2009-1, p. 59 (2009). Methods to enhance heat age resistance of polyacrylate rubbers have involved attempts to increase the oxidative stability of the polymer by manipulation of the monomer types that comprise the copolymerized units in the polymer backbone including the monomer ratio. In theory, such alterations can provide modified polymer architectures that exhibit increased stability. More effective antioxidants have also been sought. However, there is still a need to improve the high temperature resistance of polyacrylate elastomers.

Although it is known that the presence of fillers can have an adverse effect on high temperature stability of elastomers, the presence of fillers in elastomer formulations (also referred to in the art as elastomer compounds) is generally necessary for reinforcement and development of certain physical properties such as tensile strength and modulus in cured (i.e. crosslinked) compositions and articles comprising the cured compositions. Carbon black is the most widely used filler due to its excellent reinforcement properties and low cost. Other examples of fillers that are commonly used in acrylate elastomers include hydrated alumina, calcium carbonate, barium sulfate, titanium dioxide, magnesium silicate, kaolin clay, and silica. All these fillers adversely affect heat aging of cured acrylate elastomer compositions and articles comprising them.

It has been postulated that fillers accelerate heat aging of polyacrylate elastomers by facilitating the transport of oxygen to the polymer-filler interface. This leads to an increased rate of formation of free radicals at such locations through oxidative reactions. The free radicals that are generated in this manner promote crosslinking reactions, thereby resulting in eventual embrittlement of the elastomer. Reinforcing grades of carbon black such as N330 and N550 are particularly effective at facilitating transport of oxygen because they contain pores that can transport air. However, even non-porous fillers create interfacial regions between the solid filler particles and the elastomer. Few polymer chains reside in such interfacial regions and consequently diffusion of air is enhanced. Thus, exposure of the elastomer to air is generally increased in all filled elastomers compared to unfilled elastomer compositions.

As the reinforcing power of the filler increases, e.g., the ability of the filler to increase Shore A hardness, the tendency of that filler to lower resistance of the acrylate elastomer to the deleterious effects of hot air aging also increases. Such effects are disclosed for a range of carbon black types by Unimatec Chemicals Germany in a publication entitled Noxtite ACM (basic), January 2007, pp. 56-57. It would be desirable to have available an alternative filler that permits the attainment of good elastic properties such as compression set resistance and tensile elongation to break in the cured, filled elastomer and further provides the advantages of filler reinforcement (i.e. high tensile strength, modulus and Shore A hardness), but does not promote oxidative degradation at high temperatures (i.e. 160° C. or greater).

It has now been found that it is possible to produce cured acrylate elastomer compositions of high hardness, strength, and elasticity, that exhibit excellent heat aging resistance through use of polyamide as a filler.

A number of acrylate rubber-polyamide blend compositions have been disclosed in the prior art. For example, it is known to add uncured acrylate elastomers (i.e. gums) to polyamides to form toughened thermoplastic compositions. U.S. Pat. No. 4,174,358 discloses the use of various uncured acrylate elastomers or ethylene based thermoplastics comprising up to 95 mole percent ethylene, such as ethylene/methyl acrylate/monoethyl maleate/ethylenedimethacrylate tetrapolymers, or ionomers of ethylene/methyl acrylate/monoethyl maleate terpolymers as toughening additives for polyamides. The polyamide component in such compositions comprises the continuous matrix and the uncured acrylate elastomer is a minor additive. U.S. Pat. No. 5,070,145 discloses thermoplastic blends of polyamides with ethylene copolymers comprising units of dicarboxylic acid anhydrides and optionally alkyl (meth)acrylates. U.S. Pat. No. 7,544,757 discloses that blends of ethylene—alkyl acrylate polymers may be blended at levels up to 30% by weight in polyamide to produce toughened polyamide compositions.

Blends of uncured ethylene acrylic elastomers, polyamides and powdered metals are disclosed in Japanese Patent 2001-1191387.

U.S. Pat. No. 3,965,055 discloses vulcanizates prepared from a blend of rubber and 2 wt. % to 10 wt. % of a crystalline fiber-forming thermoplastic, wherein the thermoplastic is dispersed in the rubber component in particles not greater than 0.5 micron in cross section with a length to diameter ratio greater than 2. The high aspect ratio of the thermoplastic particles enables pressureless curing without void formation.

Japanese patent application H10-251452 discloses a dispersion of polyamide particles in a hydrogenated nitrile rubber (HNBR) matrix wherein a compatibilizing polymer that may be an ethylene co-polymer or an acrylate elastomer is also present. The compatibilizing polymer is ionically crosslinked by metal oxide during mixing with the HNBR and polyamide, which prevents the acrylate elastomer from forming the continuous phase. The HNBR component is then peroxide or sulfur cured.

U.S. Pat. No. 6,133,375 discloses blends of functionalized rubbers with thermoplastics in which the thermoplastic is dispersed in the rubber phase. Following addition of a curative for the rubber, the composition is crosslinked to produce a vulcanized article. Examples of functionalized rubbers which are disclosed include acrylic rubbers such as nitrile-butadiene, and hydrogenated nitrile-butadiene, epichlorohydrin, and rubbers on which reactive groups have been grafted such as carboxylated nitrile-butadiene rubber. Thermoplastics that are disclosed include polyether-ester block copolymers, polyurethanes, polyamides, polyamide ethers or ester block copolymers, and mixtures of polyamides and polyolefins. In the latter case, ethylene—alkyl acrylate copolymers comprising grafted or co-polymerized maleic anhydride, glycidyl methacylate, or (meth)acrylic acid may be used to compatibilize the polyamide-polyolefin blend.

U.S. Pat. No. 4,694,042 discloses an elastomeric thermoplastic molding material containing a coherent phase of polyamide and crosslinked elastomeric polyacrylate core shell polymers.

U.S. Pat. No. 4,275,180 discloses blends of thermoplastic polymer with acrylate rubber, the blends being crosslinked or crosslinkable by radiation or peroxide. Fillers may be used in amounts up to 40% by weight of the composition.

U.S. Patent Application 2006/0004147 discloses blends of elastomers, for example an acrylate elastomer, with thermoplastic polymers such as polyamides, in which both polymers are coupled and crosslinked by free radicals, e.g., by electron beam radiation. The compositions may comprise a continuous phase of thermoplastic with dispersed crosslinked elastomer particles, or a continuous crosslinked elastomer phase with dispersed crosslinked particles of what was initially thermoplastic.

U.S. Pat. No. 8,142,316 discloses cured blends of elastomers and thermoplastics for use in power transmission belts. The elastomer may be an ethylene acrylic elastomer, and the thermoplastic may be a polyamide. The ethylene acrylic elastomer is not noted to be amine curable, and only free radical curatives are cited. Free radical curatives are disclosed as curing agents.

It is also known to form dynamically cured thermoplastic compositions having a polyamide matrix continuous phase and a cured acrylate rubber phase that is present in the form of discrete particles. Thermoplastic elastomeric compositions comprising blends of polyamide and ionically crosslinked ethylene acrylic rubber are disclosed in U.S. Pat. No. 4,310,638. U.S. Pat. Nos. 5,591,798 and 5,777,033 disclose thermoplastic elastomer compositions comprising a blend of polyamide resins and covalently-crosslinked acrylate rubber.

U.S. Pat. No. 7,608,216 and U.S. Patent Application Publication 2006/0100368 disclose compositions prepared by admixing an uncured thermoset elastomer, for example an acrylate elastomer, with a thermoplastic polymer or another uncured (gum) elastomer. Techniques such as fractional curing, partial dynamic vulcanization, or the use of high performance reinforcing fillers are disclosed to increase the green strength of the uncured or partially cured compound. The admixed compositions may be subsequently crosslinked with a curing agent for the elastomer component.

Polyacrylate rubber-polyamide blend compositions disclosed in Zeon Chemicals L.P., HyTemp® Technical Manual, Rev. 2009-1, p. 46 (2009) are said to improve the impact strength of plastics. They may also be used to produce thermoplastic elastomers.

It has now been found that when a dispersion of discrete polyamide particles replaces all or a part of the conventional particulate reinforcing agent in a continuous polyacrylate elastomer matrix the resultant compositions, when peroxide cured, exhibit enhanced resistance to embrittlement during heat aging. In addition, such compositions maintain excellent tensile strength, modulus, hardness and elastic properties such as compression set and elongation at break that characterizes compositions containing conventional reinforcing fillers.

SUMMARY OF THE INVENTION

The present invention is directed to a curable polyamide-filled acrylate polymer composition, comprising
A. a polymer blend composition comprising
1. 40-90 wt. % of one or more amorphous acrylate polymers comprising at least 50 wt. %, based on the total weight of the polymer, of polymerized units of at least one monomer having the structure

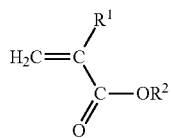

Where $R^1$ is H or $C_1$-$C_{10}$ alkyl, and $R^2$ is $C_1$-$C_{12}$ alkyl, $C_1$-$C_{20}$ alkoxyalkyl, $C_1$-$C_{12}$ cyanoalkyl, or $C_1$-$C_{12}$ fluoroalkyl; and 2. 10-60 wt. % of one or more polyamides having melting peak temperatures of at least 160° C.;

wherein i) the polymer blend composition has a green strength of less than about 2 MPa as determined according to ASTM D6746-10, ii) the one or more polyamides are present as a discontinuous phase in the polymer blend composition, and iii) the weight percentages of the one or more amorphous acrylate polymers and one or more polyamides are based on the combined weight of the one or more amorphous acrylate polymers and one or more polyamides in the polymer blend composition; and B. a peroxide curative.

The invention is also directed to a process for preparing a polyimide-filled acrylate polymer composition comprising the steps of A. providing a polymer blend composition comprising
  1. 40-90 wt. % of one or more amorphous acrylate polymers comprising at least 50 wt. %, based on the total weight of the polymer, of polymerized units of a monomer having the structure

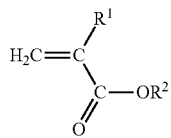

Where $R^1$ is H or $C_1$-$C_{10}$ alkyl and $R^2$ is $C_1$-$C_{12}$ alkyl, $C_1$-$C_{20}$ alkoxyalkyl, $C_1$-$C_{12}$ cyanoalkyl, or $C_1$-$C_{12}$ fluoroalkyl, and 2. 10-60 wt. % of one or more polyamides having melting peak temperatures of at least 160° C.;
  wherein the weight percentages of the one or more amorphous acrylate polymers and one or more polyamides are based on the combined weight of the one or more amorphous acrylate polymers and the one or more polyamides in the polymer blend composition;

B. mixing the polymer blend composition at a temperature above the melting peak temperatures of the one or more polyamides to disperse the one or more polyamides within the one or more amorphous acrylate polymers, thereby forming a polyamide-filled acrylate polymer composition; and C. cooling the polyamide-filled acrylate polymer composition to a temperature below the crystallization peak temperatures of the one or more polyamides,
  wherein i) the polyamide-filled acrylate polymer composition comprises a continuous amorphous acrylate polymer phase and a discontinuous polyamide phase and ii) has a green strength of less than about 2 MPa as determined according to ASTM D6746-10.

The invention is further directed to a process for preparing a curable acrylate elastomer composition which comprises the steps of providing a polyamide-filled acrylate polymer composition prepared by the above-described process and adding a peroxide curative comprising a peroxide and optionally a coagent to the polyamide-filled acrylate polymer composition at a temperature below the crystallization peak temperatures of the one or more polyamides to form a curable polyamide-filled acrylate polymer composition.

The invention is further directed to a process for preparing an acrylate elastomer composition comprising the steps of A. providing a polyamide-filled acrylate polymer composition that has been prepared by a process comprising the steps
  1. providing a polymer blend composition comprising
    a. 40-90 wt. % of one or more amorphous acrylate polymers comprising a) at least 50 wt. %, based on the total weight of the polymer, of polymerized units of at least one monomer having the structure

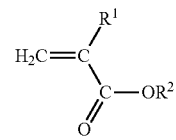

Where $R^1$ is H or $C_1$-$C_{10}$ alkyl, and $R^2$ is $C_1$-$C_{12}$ alkyl, $C_1$-$C_{20}$ alkoxyalkyl, $C_1$-$C_{12}$ cyanoalkyl, or $C_1$-$C_{12}$ fluoroalkyl; and b. 10-60 wt. % of one or more polyamides having melting peak temperatures of at least 160° C.
    wherein the weight percentages of the one or more amorphous acrylate polymers and one or more polyamides are based on the combined weight of the one or more amorphous acrylate polymers and one or more polyamides in the polymer blend;

2. mixing the polymer blend composition at a temperature above the melting peak temperatures of the one or more polyamides to disperse the one or more polyamides within the one or more acrylate polymers, thereby forming a polyamide-filled acrylate polymer composition; and 3. cooling the polyamide-filled acrylate polymer composition to a temperature below the crystallization peak temperatures of the one or more polyamides thereby forming an acrylate polymer composition that i) comprises a continuous amorphous acrylate polymer phase and a discontinuous polyamide phase and ii) has a green strength of less than about 2 MPa as determined according to ASTM D 6746-10; and B. adding a curative comprising a peroxide and optionally a coagent to the cooled polyamide-filled acrylate polymer composition to form a curable polyamide-filled acrylate polymer composition; and C. exposing the curable polyamide-filled acrylate polymer composition to a temperature of at least 100° C. for a time sufficient to crosslink the amorphous acrylate polymer, thereby forming a cured polyamide-filled acrylate elastomer,
wherein the cured polyamide-filled acrylate elastomer has a Shore A hardness of at least 40, as determined according to ASTM D 2240-06 (1 second reading) and comprises a continuous amorphous acrylate polymer phase and a discontinuous polyamide phase.

The invention is further directed to a curable acrylate polymer composition consisting essentially of
A. a polymer blend composition comprising
   1. 40 to 90 wt. % of one or more amorphous acrylate polymers comprising at least 50 wt. %, based on the total weight of the amorphous acrylate polymer, of polymerized units of at least one monomer having the structure

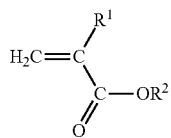

Where $R^1$ is H or $C_1$-$C_{10}$ alkyl and $R^2$ is $C_1$-$C_{12}$ alkyl, $C_1$-$C_{20}$ alkoxyalkyl, $C_1$-$C_{12}$ cyanoalkyl, or $C_1$-$C_{12}$ fluoroalkyl, and
   2. 5-60 wt. % of one or more polyamides having melting peak temperatures of at least 160° C.;
   wherein i) the one or more polyamides are present as a discontinuous phase in the polymer blend composition and ii) the weight percentages of the one or more amorphous acrylate polymers and one or more polyamides are based on the combined weight of the one or more amorphous acrylate polymers and one or more polyamides in the polymer blend composition;
B. a peroxide curative; and
C. a reinforcing filler, the reinforcing filler being present in the curable acrylate polymer composition in an amount that causes an increase in the Shore A hardness of the cured acrylate polymer composition of no more than about 20 points as compared to the Shore A hardness of a control composition that is of identical composition but for the absence of the reinforcing filler, wherein i) the curable acrylate polymer composition and control composition are formed into test specimens of 1 mm to 2.5 mm thickness, the test specimens are cured by exposure to a temperature of 175° C. for 10 minutes in a closed mold at a pressure of at least 10 MPa, ii) Shore A hardness of the cured acrylate polymer composition and the cured control composition is determined according to ASTM D 2240-06 (1 second reading), and iii) the cured acrylate polymer composition has a Shore A hardness greater than 40.

DETAILED DESCRIPTION OF THE INVENTION

The present invention is directed to compositions comprising blends of acrylate polymers and polyamides that, when cured with a peroxide curative system, exhibit enhanced resistance to physical property loss during heat aging. The invention is also directed to a process for preparation of the acrylate polymer/polyamide blend compositions, a process for preparation of curable acrylate polymer/polyamide blend compositions and a process for preparation of elastomers from the curable acrylate polymer/polyamide blend compositions.

It has been found that when polyamide particles largely replace carbon black and conventional reinforcing inorganic fillers in curable amorphous acrylate polymers (also known as acrylate polymer gum rubbers) such that the acrylate polymer forms a continuous phase and the polyamide forms a discontinuous phase, the resultant compositions, when cured, exhibit surprising improvements in physical properties. That is, the curing process, which is also commonly referred to as crosslinking or vulcanization, converts the polyamide-filled acrylate polymer composition to an acrylate polymer elastomer composition that exhibits enhanced heat aging resistance compared to acrylate polymer elastomers that comprise carbon black or other reinforcing fillers.

The term "reinforcement" refers to an increase in the hardness and tensile strength of the cured (i.e. crosslinked) composition, relative to the similarly crosslinked but unfilled acrylate polymer gum rubber. In particular, a crosslinked acrylate polymer elastomer composition having a Shore A hardness (ASTM D2240-06, 1 second reading) less than 40 is too soft for a large majority of acrylate copolymer elastomer applications, and therefore may be considered insufficiently reinforced. A crosslinked acrylate polymer composition having a tensile strength of less than 4 MPa (ASTM D412-06, die C) is too weak for a large majority of acrylate polymer applications, and therefore may be considered to be insufficiently reinforced.

One embodiment of the invention is a curable acrylate polymer composition that comprises a polymer blend composition and a peroxide curative. The polymer blend composition is characterized by having a green strength of less than about 2 MPa as determined in accordance with ASTM D6746-10.

The polymer blend composition comprises two polymers, an acrylate polymer and a polyamide. The polymer blend is referred to herein as a polyamide-filled acrylate polymer. The acrylate polymer component of the curable polyamide-filled acrylate polymer compositions of the invention comprises one or more amorphous acrylate polymers.

The acrylate polymer component of the curable polyamide-filled acrylate polymer composition that is formed by the process of the invention comprises one or more amorphous acrylate polymers.

The term amorphous as used herein with reference to an acrylate polymer means a polymer which exhibits little or no crystalline structure at room temperature in the unstressed state. By amorphous is meant that the acrylate polymer has a heat of fusion of less than 4 J/g as determined according to ASTM D3418-08.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene, methyl acrylate and 3 weight % of the monoethyl ester of maleic acid", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when noted) of the stated comonomers. It follows as a corollary that a copolymer is not the product of a reaction mixture containing given comonomers in specific amounts, unless expressly stated in limited circumstances to be such.

The amorphous acrylate polymers useful in the practice of the invention described herein comprise polymerized units of alkyl esters and/or alkoxyalkyl esters of propenoic acid. Examples of such esters include alkyl acrylates, and alkoxyalkyl acrylates as well as species wherein the propenoic acid is substituted with a $C_1$-$C_{10}$ alkyl group. Examples of such species include alkyl methacrylates, alkyl ethacrylates, alkyl propacrylates, and alkyl hexacrylates, alkoxyalkyl methacrylates, alkoxyalkyl ethacryates, alkoxyalkyl propacrylates and alkoxyalkyl hexacrylates. In addition, the alkyl ester groups of the propenoic acid esters may be substituted with cyano groups or one or more fluorine atoms. That is, the ester group will be a $C_1$-$C_{12}$ cyanoalkyl group or a $C_1$-$C_{12}$-fluoroalkyl group. The acrylate polymers may also comprise copolymerized units of more than one species of the alkyl esters and/or alkoxyalkyl esters, for example two alkyl acrylates.

The alkyl and alkoxyalkyl esters of propenoic acid and substituted propenoic acids are preferably $C_1$-$C_{12}$ alkyl esters of acrylic or methacrylic acid or $C_1$-$C_{20}$ alkoxyalkyl esters of acrylic or methacrylic acid. Examples of such esters include methyl acrylate, methyl methacrylate, ethyl acrylate, ethyl methacrylate, butyl acrylate, butyl methacrylate, 2-ethylhexyl acrylate, 2-methoxyethylacrylate, 2-ethoxyethylacrylate, 2-(n-propoxy)ethylacrylate, 2-(n-butoxy)ethylacylate, 3-methoxypropylacrylate and 3-ethoxypropylacrylate. Examples of esters that contain $C_1$-$C_{12}$ cyanoalkyl and fluoroalkyl groups include cyanomethylacrylate, 1-cyanoethylacrylate, 2-cyanopropylacrylate, 3-cyanopropylacrylate, 4-cyanobutylacrylate, 1,1-dihydroperfluoroethyl methacrylate, 1,1-dihydroperfluoroethyl acrylate, 1,1-dihydroperfluoropropyl methacrylate, 1,1-dihydroperfluoropropyl acrylate, and 1,1,5-trihydroperfluorohexyl(meth)acrylate, and 1,1,5-trihydroperfluorohexyl methacrylate. Preferably, the ester group will comprise $C_1$-$C_8$ alkyl groups. More preferably, the ester group will comprise $C_1$-$C_4$ alkyl groups. Particularly useful alkyl acrylate esters are methyl acrylate, ethyl acrylate and butyl acrylate. A particularly useful alkyl methacrylate ester is methyl methacrylate. Minor amounts of unsaturated acetates such as ethenyl acetate or 3-butenyl acetate may be incorporated into the polymer without deviating from the scope of this invention. By minor amounts is meant less than 1 wt. %, based on the weight of the acrylate polymer.

Esters that comprise comonomer units in the acrylate polymers may be generally represented by the formula

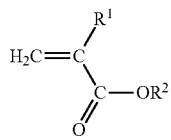

Where $R^1$ is H or $C_1$-$C_{10}$ alkyl and $R^2$ is $C_1$-$C_{12}$ alkyl, $C_1$-$C_{20}$ alkoxyalkyl, $C_1$-$C_{12}$ cyanoalkyl, or $C_1$-$C_{12}$ fluoroalkyl.

In certain embodiments, the acrylate polymers may be polymers derived from copolymerization of more than one acrylate comonomer. Examples of such acrylate polymers include copolymers of methyl acrylate and butyl acrylate and copolymers of methyl acrylate, butyl acrylate and the monoethyl ester of 1,4-butenedioic acid.

The concentration of propenoic acid ester comonomers that are present in the acrylate polymer will be at least 50 weight percent, based on the weight of the polymer. Preferably, the concentration will be at least 55 weight percent, and more preferably at least 60 weight percent. If the concentration of propenoic acid ester is below 50 wt %, the likelihood that some crystallinity will be present is high, for example in acrylate polymers that are ethylene acrylate ester copolymers. In addition, a high content of non-polar monomer such as ethylene diminishes compatibility of the acrylate polymer with nylon, and therefore reinforcement will be decreased.

The polymers may additionally comprise a copolymerized cure site monomer in any amount. For example, the acrylate polymer may comprise diene cure site monomers such 1,4-butadiene, 1,6-hexadiene, ethylidene norbornene, and the like. If copolymerized diene cure site monomers are not present, the acrylate polymers must comprise at least 50 mol % ethylene to confer peroxide curability.

In certain embodiments, wherein the acrylate polymers are used to form curable compositions comprising a peroxide curative, the acrylate polymer will preferably be substantially free of amine reactive cure site comonomer units selected from the group consisting of unsaturated carboxylic acids, anhydrides of unsaturated carboxylic acids, unsaturated epoxides and mixtures of two or more thereof. By substantially free is meant that such polymers will comprise less than 0.3 mol % of the amine reactive cure site comonomer units. In certain embodiments, these comonomers will be present within the range from about 0.03 to 0.3 mol % in the acrylate polymers used to form peroxide-curable compositions. When two or more amorphous acrylate polymers are present in the curable composition, the range of about 0.03 to 0.3 mol % amine reactive cure sites applies to the weight average of mole percent cure site in the individual acrylate polymers. Although carboxylic acids, anhydrides or epoxide cure sites can inhibit peroxide curing and/or lead to decreased compression set resistance, these moieties also improve adhesion between the polyamide particles and the acrylate elastomer continuous phase. The improved adhesion between the polyamide and polyacrylate phases leads to improved tensile and compression set properties in the cured compounds. Consequently acrylate polymers comprising such comonomers can be preferred in limited amounts for purposes of forming the peroxide-curable compositions described herein. The adverse effects of high levels of carboxylic acids, anhydrides, or epoxides (i.e., greater than 0.3 mol %) may be reduced or eliminated if these groups are consumed prior to the peroxide curing step, e.g., by reaction with amines or epoxides. In addition, chlorinated cure sites are not generally desirable because the carbon-chlorine bond is unstable at the melt processing temperature of the polyamide (greater than 160° C.), and the decomposition products may be toxic or damaging to the polyamide or acrylate polymer. It is preferable that such cure sites are also absent or that the acrylate polymers comprise less than 0.3 mol % of these cure site monomers. Although the deleterious effects of these cure sites may be moderated by various methods, additional complexity and technical effort is required.

In some embodiments, the acrylate polymers useful in the practice of the invention will also comprise copolymerized units of additional comonomers, for example ethylene and other olefins such as propylene, 1-butene, 1-hexene, 1-octene, and the like. The olefin will be present at a concentration of less than 50 wt %, more preferably less than 45 wt %, and most preferably about 40 wt % or less, based on the weight of the acrylate polymer.

Cure site monomers that permit curing by metallic soap/sulfur donors or metallic soap/amine cure systems may be present in the polyacrylate elastomer, but are preferably absent because they interfere with peroxide curing.

Alkyl acrylate dipolymer rubbers are particularly suitable acrylate polymers for use in the process described herein. An example of such a rubber is Vamac® DP acrylic elastomer, available from DuPont Performance Elastomers L.L.C.

The acrylate polymers useful in the practice of the invention are curable, i.e. crosslinkable, due to the presence in the polymer chain of polymerized monomer units that can take part in free radical reactions. Peroxide curatives function by forming free radical polymer species under elevated temperature conditions, e.g. at temperatures above 100° C. These species react to form interchain crosslinks either directly between polymer molecules or indirectly by reaction with multifunctional coagents, such as N,N'-(m-phenylene)dimaleimide.

The acrylate polymers that are used to prepare the curable polyamide-reinforced acrylate polymer compositions according to a process of the invention are curable gums, i.e. they are substantially uncured rubbers, and retain reactivity towards crosslinking by peroxide curative systems after blending with the polyamide. By substantially uncured is meant that the unblended rubber has a sufficiently low viscosity to be shaped into a finished article by molding or extrusion. Preferably, the Mooney viscosity (ASTM D1646, ML 1+4 at 100° C.) of the uncured polyacrylate rubber is less than 120, more preferably less than 80 and most preferably less than 40. By retaining reactivity towards crosslinking is meant that the curable composition intended for production of a molded or extruded article (i.e. the composition that includes acrylate polymer, polyamide and curative) exhibits an increase in torque when tested in a moving die rheometer (MDR 2000 or equivalent from Alpha Technologies, operating at an 0.5 degree arc at 190° C. for 15 minutes) of at least 2.5 dN-m, more preferably at least 4 dN-m, and most preferably more than 5.5 dN-m.

The acrylate polymers are amorphous polymers, rather than crystalline thermoplastics. That is, the degree of crystallinity of the acrylate polymer will generally be less than 4 J/g as measured by ASTM D3418, preferably less than 2 J/g, and most preferably about 0 J/g.

Acrylate polymers of this type may be prepared for example according to the procedures described in U.S. Pat. Nos. 3,904,588; 4,520,183; 6,156,849, and 7,402,631.

The polymer blend composition that comprises one component of the curable acrylate polymer compositions described herein comprises one or more polyamides having a melting peak temperature of at least about 160° C. as determined in accordance with ASTM D3418-08 Preferably the polyamide is solid at the curing temperature of the acrylate elastomer, meaning that the curing temperature is less than the melting peak temperature. While not wishing to be bound by theory, when the polyamide not solid at the curing temperature, curative readily diffuses into the polyamide, rendering the blend difficult to cure. Polyamide resins are well known in the art and embrace those semi-crystalline resins having a weight average molecular weight of at least 5,000 and include those compositions commonly referred to as nylons. Thus, the polyamide component useful in the practice of the invention includes polyamides and polyamide resins such as nylon 6, nylon 7, nylon 6/6, nylon 6/10, nylon 6/12, nylon 11, nylon 12, polyamides comprising aromatic monomers, and poly(amide 6-b-ethylene oxide). The resins may be in any physical form, such as pellets and particles of any shape or size, including nanoparticles.

The viscosity of the polyamide resins can vary widely while meeting the aims of the present invention. To ensure that the polyamide becomes dispersed within a continuous phase of acrylate elastomer, it is desirable that the polyamide have an inherent viscosity greater than 0.9 dL/g, more preferably greater than 1.1 dL/g, and most preferably greater than 1.3 dL/g, as measured in accordance with ASTM D2857-95, using 96% by weight sulfuric acid as a solvent at a test temperature of 25° C.

In general, as the concentration of the polyamide in the acrylate polymer blend increases, the use of a polyamide of higher inherent viscosity becomes more desirable. In certain embodiments, a polyamide with a high content of amine end groups, about 60 meq/Kg or greater, can be desirable and permits the use of a low viscosity polyamide of inherent viscosity about 0.89 dL/g. Such a high amine end group content results in a grafting reaction between amine reactive cure sites present in the acrylate rubber and the polyamide amine end groups which can help to disperse the polyamide in the acrylate rubber. In some instances, however, use of such high amine content polyamide can result in gelling of the acrylate rubber during melt mixing with the polyamide, making subsequent processing more difficult. Gelling of the acrylate elastomer becomes more problematic as the concentration of polyamide in the acrylate copolymer increases.

The polyamide resin can be produced by condensation polymerization of equimolar amounts of a saturated dicarboxylic acid containing from 4 to 12 carbon atoms with a diamine, in which the diamine contains from 4 to 14 carbon atoms. To promote adhesion between the acrylate rubber and the nylon, preferably the polyamide will contain some amine end groups. Polyamide types polymerized from diacids and diamines may contain some molecules having two amine groups. In such cases, certain combinations of polyamide and acrylate rubber can crosslink or gel slightly so as to produce compositions with compromised extrusion processability. Polyamide types prepared by ring opening polymerization reactions such as nylon 6, or those based solely on aminocarboxylic acids such as nylon 7 or 11 are most preferred because they avoid the possibility of crosslinking during blending with the acrylate rubber. Such polyamide types contain molecules with at most one amine group each.

Examples of polyamides include polyhexamethylene adipamide (66 nylon), polyhexamethylene azelaamide (69 nylon), polyhexamethylene sebacamide (610 nylon) and polyhexamethylene dodecanoamide (612 nylon), the polyamide produced by ring opening of lactams, i.e. polycaprolactam, polylauric lactam, poly-11-aminoundecanoic acid, and bis(paraminocyclohexyl)methanedodecanoamide. It is also possible to use polyamides prepared by the copolymerization of two of the above polymers or terpolymerization of the above polymers or their components, e.g. an adipic, isophthalic acid hexamethylene diamine copolymer.

Typically, polyamides are condensation products of one or more dicarboxylic acids and one or more diamines, and/or one or more aminocarboxylic acids, and/or ring-opening polymerization products of one or more cyclic lactams. Polyamides may be fully aliphatic or semi-aromatic.

Fully aliphatic polyamides useful in practice of the present invention are formed from aliphatic and alicyclic monomers such as diamines, dicarboxylic acids, lactams, aminocarboxylic acids, and their reactive equivalents. A suitable aminocarboxylic acid is 11-aminododecanoic acid. Suitable lactams are caprolactam and laurolactam. In the context of this invention, the term "fully aliphatic polyamide" also refers to copolymers derived from two or more such monomers and blends of two or more fully aliphatic polyamides. Linear, branched, and cyclic monomers may be used.

Carboxylic acid monomers comprised in the fully aliphatic polyamides include, but are not limited to aliphatic carboxylic acids, such as for example adipic acid, pimelic acid, suberic acid, azelaic acid, decanedioic acid, dodecanedioic acid, tridecanedioic acid, tetradecanedioic acid, and pentadecanedioic acid. Diamines can be chosen from diamines having four or more carbon atoms, including, but not limited to tetramethylene diamine, hexamethylene diamine, octamethylene diamine, decamethylene diamine, dodecamethylene diamine, 2-methylpentamethylene diamine, 2-ethyltetramethylene diamine, 2-methyloctamethylenediamine; trimethylhexamethylenediamine, meta-xylylene diamine, and/or mixtures thereof.

Semi-aromatic polyamides are also suitable for use in the present invention. Such polyamides are homopolymers, dipolymers, terpolymers or higher order polymers formed from monomers containing aromatic groups. One or more aromatic carboxylic acids may be terephthalic acid or a mixture of terephthalic acid with one or more other carboxylic acids, such as isophthalic acid, phthalic acid, 2-methyl terephthalic acid and naphthalic acid. In addition, the one or more aromatic carboxylic acids may be mixed with one or more aliphatic dicarboxylic acids. Alternatively, an aromatic diamine such as meta-xylylene diamine can be used to provide a semi-aromatic polyamide, an example of which is a homopolymer comprising meta-xylylene diamine and adipic acid.

Preferred polyamides are homopolymers or copolymers wherein the term copolymer refers to polyamides that have two or more amide and/or diamide molecular repeat units.

The polyamide component may comprise one or more polyamides selected from Group I polyamides having a melting point of greater than 160° C., but less than 210° C., and comprising an aliphatic or semiaromatic polyamide, for example poly(pentamethylene decanediamide), poly(pentamethylene dodecanediamide), poly(ε-caprolactam/hexamethylene hexanediamide), poly(ε-caprolactam/hexamethylene decanediamide), poly(12-aminododecanamide), poly(12-aminododecanamide/tetramethylene terephthalamide), and poly(dodecamethylene dodecanediamide); Group (II) polyamides having a melting point of at least 210° C., and comprising an aliphatic polyamide selected from the group consisting of poly(tetramethylene hexanediamide), poly(ε-caprolactam), poly(hexamethylene hexanediamide), poly(hexamethylene dodecanediamide), and poly(hexamethylene tetradecanediamide); Group (III) polyamides having a melting point of at least 210° C., and comprising about 20 to about 35 mole percent semiaromatic repeat units derived from monomers selected from one or more of the group consisting of (i) aromatic dicarboxylic acids having 8 to 20 carbon atoms and aliphatic diamines having 4 to 20 carbon atoms; and about 65 to about 80 mole percent aliphatic repeat units derived from monomers selected from one or more of the group consisting of an aliphatic dicarboxylic acid having 6 to 20 carbon atoms and said aliphatic diamine having 4 to 20 carbon atoms; and a lactam and/or aminocarboxylic acid having 4 to 20 carbon atoms; Group (IV) polyamides comprising about 50 to about 95 mole percent semiaromatic repeat units derived from monomers selected from one or more of the group consisting of aromatic dicarboxylic acids having 8 to 20 carbon atoms and aliphatic diamines having 4 to 20 carbon atoms; and about 5 to about 50 mole percent aliphatic repeat units derived from monomers selected from one or more of the group consisting of an aliphatic dicarboxylic acid having 6 to 20 carbon atoms and said aliphatic diamine having 4 to 20 carbon atoms; and a lactam and/or aminocarboxylic acid having 4 to 20 carbon atoms; Group (V) polyamides having a melting point of at least 260° C., comprising greater than 95 mole percent semiaromatic repeat units derived from monomers selected from one or more of the group consisting of aromatic dicarboxylic acids having 8 to 20 carbon atoms and aliphatic diamines having 4 to 20 carbon atoms; and less than 5 mole percent aliphatic repeat units derived from monomers selected from one or more of the group consisting of an aliphatic dicarboxylic acid having 6 to 20 carbon atoms and said aliphatic diamine having 4 to 20 carbon atoms; a lactam and/or aminocarboxylic acid having 4 to 20 carbon atoms; The polyamide may also be a blend of two or more polyamides.

Preferred polyamides include nylon 6, 6/6, and Group IV polyamides having a melting point less than about 270° C. These polyamides have a melting point sufficiently high so as not to limit the scope of applications for the inventive materials, but not so high that production of the blends causes significant degradation of the acrylate polymer.

Polyamides suitable for use in the invention are widely commercially available, for example Zytel® resins, available from E.I. du Pont de Nemours and Company, Wilmington, Del., USA, Durethan® resins, available from Lanxess, Germany, and Ultramid® resins available from BASF, USA.

The polyamide-filled acrylate polymer compositions of the invention comprise 40-90 weight percent of the acrylate polymer component described herein and 10-60 weight percent of the polyamide component described herein, based on the total weight of the acrylate polymer and polyamide components. Preferably, the curable compositions will comprise 50 to 80 weight percent acrylate polymer component and 20 to 50 weight percent polyamide component, based on the total weight of the acrylate polymer and polyamide components. More preferably, the curable compositions will comprise 55 to 70 weight percent acrylate polymer component and 30 to 45 weight percent polyamide component based on the total weight of the acrylate polymer and polyamide components. These ratios provide a polymer blend composition wherein a cured article made from the blend exhibits sufficient Shore A hardness that little or no additional filler is needed to further increase the hardness of the cured composition. In addition, the polymer blends exhibit green strengths of less than about 2 MPa, as determined in accordance with ASTM D6746-10 and have good cure responses when compounded with a curative to form a curable composition, preferably at least 2.5 dN-m and more preferably at least 4 dN-m, as determined in accordance with ASTM D5289-07a using an MDR 2000 from Alpha Technologies operating at 0.5° arc and at test conditions of 190° C. for 15 minutes, where ML refers to the minimum torque value measured and MH refers to the maximum torque value attained after the measurement of ML. The amorphous acrylate polymer component may be made up of one or more than one acrylate polymers of the type described herein as being suitable for use in the practice of the invention. Similarly, the polyamide component may be made up of one or more than one polyamides of the type described herein as being suitable for use in the practice of the invention.

The polyamide-filled acrylate polymer compositions may be formed by mixing the polyamide component into the acrylate polymer component at temperatures above the melting peak temperature of the polyamide, under conditions that do not produce a dynamic cure of the acrylate polymer, followed by cooling the thus-produced polymer blend to form a polyamide-filled acrylate polymer composition. That is, a peroxide curative will not be present when the polyamide component and acrylate polymer component are being mixed. This is because the mixing temperature specified is above that at which crosslinking and/or gelling of the acrylate polymer will occur.

Cooling of the composition formed by mixing the acrylate polymer component and polyamide component serves to crystallize the polyamide domains so that the polyamide becomes solid and therefore cannot coalesce to form a continuous phase upon subsequent mixing, e.g., when mixed with peroxide curative to form a curable composition. The temperature below which the blend must be cooled can be determined by measuring the crystallization peak temperature according to ASTM D3418-08. The polyamide-filled acrylate polymer compositions may exhibit multiple crystallization peak temperatures. In such cases, the lowest crystallization peak temperature is taken as the temperature below which the blend must be cooled to fully solidify the polyamide component. Generally, the blend will be cooled to 40° C. or less, which is sufficient to solidify the polyamides useful in the practice of the present invention.

According to one aspect of the process described herein, wherein a polyamide-filled acrylate polymer composition is formed, a blend of the acrylate polymer and polyamide is mixed at a temperature above the melting peak temperature of the polyamide to disperse the polyamide within the acrylate polymer, thereby forming a polyamide-filled acrylate polymer composition. The mixing step may be conducted on a heated two-roll rubber mill but it is generally conducted in internal mixing equipment used to process thermoplastic compounds or formulations because of the high temperatures used. Such equipment includes Banbury® internal mixers, Haake Rheocord® mixers, Brabender Plastographs®, single and twin screw extruders, and Buss® Kneaders. The mixing step provides a polymer blend composition that, when cooled, comprises a homogeneous mixture of an amorphous acrylate polymer continuous phase and a polyamide discrete phase. The particle size of the polyamide phase may range widely and still provide technical advantages in the finished article, but generally better properties are obtained when the majority of dispersed polyamide particles present have dimensions of less than about 2 microns in diameter, and are approximately spherical. The polyamide-filled acrylate polymer composition prepared by this process retains a sufficiently low viscosity to permit mixing in conventional rubber processing equipment. Preferably, the Mooney viscosity (ML 1+4, 100° C.) of the blend is less than 120, more preferably less than 100, and most preferably less than 80.

In addition to the acrylate polymer and the polyamide, the polyamide-filled acrylate polymer composition may also comprise processing aids and compounding ingredients that are chemically stable at the mixing temperature, i.e. above 160° C. Generally, this will not include crosslinking or curing agents, accelerators, or scorch retarders. Such components generally react or decompose to some degree at temperatures of 160° C. or higher. Examples of components that may be present include other ingredients normally useful in elastomer compounds (i.e. curable formulations), such as colorants, conventional mineral or carbon black reinforcing agents, antioxidants, processing aids, fillers and plasticizers. For optimal heat aging resistance, it is desirable to maintain the concentration of conventional reinforcing agents to as low a level as possible, but other properties may be improved by inclusion of such additives. Most commonly, ingredients such as conventional reinforcing agents, colorants, antioxidants, processing aids, plasticizers and the like will be added during a low temperature mixing process, for example during the step wherein a curing agent is added.

Fillers, including carbon black, may be optionally added to the polyamide-reinforced polyacrylate polymer composition but they are generally not necessary or desirable. The fillers may be present in forms well known in the art, including in the form of so-called nano-materials where at least one of the dimensions of the particles is in the range of 1 to 1000 nm. Small amounts of such optional fillers may be added in certain embodiments so long as the optional fillers do not adversely affect the heat resistance of the cured polyamide-reinforced polyacrylate polymer compositions. By adversely affect is meant that embrittlement and/or hardening during heat aging occurs to an extent that the polyacrylate polymer composition exhibits an elongation at break, or Eb, of less than 100%, as measured on an ASTM D412-C dumbbell test specimen cut from a molded (and optionally post cured) plaque, after being heat aged for 1 week at 190° C. in air.

If additional reinforcing fillers are used, the filler particles will generally be present in amounts such that the filler contributes less than about 20 points Shore A hardness, preferably less than 10 points, and most preferably less than 5 points to the Shore A hardness of the press cured polyamide-filled acrylate polymer composition.

The compositions of the invention may also comprise additional polymers provided that when addition of such polymers occurs at a temperature above the melting peak temperature of the polyamide the presence of such polymers does not increase the green strength of the resulting polyamide-filled acrylate composition to above about 2 MPa. For example, the polyamide-filled acrylate polymer compositions of the invention may be blended with an acrylate polymer to dilute the polyamide content of the inventive composition by any mixing process, either above or below the melting peak temperature of the polyamide. The acrylate polymer used for the blending process may be the same as or different from that of the inventive composition, and may further comprise fillers, curatives, or other ingredients. Preferably, such dilution occurs at a temperature below that of the melting peak temperature of the polyamide, and if a curative is present, below the temperature needed to initiate curing.

After the acrylate polymer component and polyamide component of the polymer blend composition have been mixed at a temperature of 160° C. or above for a period sufficient to form a homogeneous mixture of melted polyamide and amorphous acrylate polymer, the mixture is cooled to below the crystallization peak temperature of the one or more polyamides. This provides a composition having discrete polyamide particles within a continuous amorphous acrylate polymer matrix.

In general, compositions that result from mixing acrylate polymer rubbers and polyamides may comprise a wide range of blend morphologies, ranging from those wherein discrete, discontinuous polyamide particles exist within a continuous amorphous acrylate polymer matrix, to compositions wherein high aspect ratio polyamide "threads" are present, to compositions that comprise co-continuous structures, to compositions comprising discrete acrylate polymer domains within a continuous phase of polyamide. Most of these compositions have morphologies that are unsuitable for use in the present invention, because the blends have very high Mooney viscosities, i.e. Mooney viscosity ML 1+4, 100° C. of greater than about 120, and/or poor elastic properties such as a low tensile elongation to break, and high compression set. However, if the ratio of components is chosen as described herein, polyamide-filled acrylate copolymer compositions can be produced that have Mooney viscosities below about 120 mL 1+4, 100° C. and good elastic properties. Such polyamide-filled acrylate polymer compositions of the invention and those suitable for use in the processes of the invention are characterized by having green strengths of less than about 2 MPa, as determined by measurement in accordance with ASTM D6746-10. The resultant compositions have good processability and elastic properties. A green strength value less than about 2 MPa is a basic characteristic of the compositions of the invention and is confirmatory of the presence of a continuous acrylate polymer phase and a discontinuous polyamide phase in the polyamide-filled acrylate polymer compositions. By "discontinuous polyamide phase" is meant that the polyamide is present in the polymer blend compositions of the invention as dispersed particles, or domains surrounded by a continuous amorphous acrylate polymer matrix. In general, the polyamide domains will be completely isolated from each other within the continuous amorphous acrylate polymer matrix. However, in certain instances a small percentage, less than about 5%, of localized sites in the polymer blend composition may exist wherein the polyamide domains are aggregated or connected to each other. Such polymer blend compositions that have green strengths of less than about 2 MPa are considered to comprise a discontinuous polyamide phase for purposes of the invention. Preferably, the green strength of the polyamide-filled acrylate polymers will be below about 1 MPa.

A green strength greater than 2 MPa indicates the blend has high Mooney viscosity, poor extrusion processability, or poor elastic properties after curing. These deficiencies may arise because the polyamide phase of the blend is continuous or co-continuous with the acrylate polymer, or because the end groups of the polyamide have reacted with the cure site of the acrylate copolymer to an extent that the acrylate copolymer has gelled, or any combination of the two.

The polyamide-filled acrylate polymer compositions prepared in the above-described process step are polyamide-filled compositions to which a peroxide curative may then be added to form curable acrylate polymer compositions. Suitable peroxide curatives, also known as peroxide curing systems, comprise a peroxide and optionally a coagent. Examples of peroxides and coagents include curative systems as generally known in the art, including those described herein, operative at the temperature employed during vulcanization. For example, useful organic peroxides are those that decompose rapidly within the temperature range of 150° C. to 250° C. These include, for example, dicumyl peroxide, 2,5-bis(t-butylperoxy)-2,5-dimethylhexane, and α',α'-bis(t-butylperoxy)-diisopropylbenzene (available from GEO Specialty Chemicals under the tradename Vul-cup®). In a typical vulcanizate composition the peroxide is present in amounts of from about 0.5 to 5 parts phr (parts per hundred parts rubber, i.e. parts per hundred parts of the one or more acrylate polymers present). The peroxide may be adsorbed on an inert carrier such as calcium carbonate, carbon black or kieselguhr; however, the weight of the carrier is not included in the above range. Generally, an optional coagent will be present to increase the state of cure of the finished part. The coagent can be for example, N,N'-(m-phenylene)dimaleamide, trimethylolpropane trimethylacrylate, tetraallyloxyethane, triallyl cyanurate, tetramethylene diacrylate, or polyethylene oxide glycol dimethacrylate. A preferred coagent is N,N'-(m-phenylene)dimaleamide, available from DuPont Performance Elastomers L.L.C. as HVA-2. The amount of the coagent used is generally about 0 to 5 parts by weight per 100 parts polyacrylate (phr), preferably about 1 to 5 parts phr. The coagents usually contain multiple unsaturated groups such as allyl groups or acrylic ester groups. While their mode of action is not known with certainty, it is thought that they react with the initial radical formed on the polymer backbone to form a more stable radical, which undergoes coupling reactions to form crosslinks more readily than chain scission reactions.

The addition of curative to the polyamide-filled acrylate polymer composition will desirably take place at a temperature below the decomposition temperature of the curative and below the temperature at which the crosslinking reaction occurs. Generally, the addition will take place at a temperature below 140° C., preferably at a temperature no greater than 120° C. The addition of the curative may take place simultaneously with the addition of optional processing ingredients, such as colorants, conventional carbon black or mineral reinforcing agents, antioxidants, processing aids, fillers and plasticizers, or it may be an operation separate from addition of other ingredients. The addition may be conducted on a two-roll rubber mill or by using internal mixers suitable for compounding gum rubber compositions, including Banbury® internal mixers, Haake Rheocord® mixers, Brabender Plastograph® mixers, Farrel Continuous Mixers, or single and twin screw extruders.

Curable polyamide-filled acrylate polymer compositions prepared by the above-described process are novel compositions that are useful for preparing cured (i.e. thermoset) elastomeric compositions having excellent physical properties and enhanced heat aging resistance.

Curing or crosslinking of the curable polyamide-filled acrylate composition, also referred to as vulcanization, typically involves exposing the compounded composition to elevated temperature and elevated pressure for a time sufficient to crosslink the polymer. Such operations generally are conducted by placing the curable composition into a mold that is heated in a press (often referred to as press-curing). Extruded parts are often cured in a pressurized autoclave. After the press cure or autoclave cycle is completed, this initial cure may be followed by an optional post-cure heating cycle at ambient pressure to further cure the polyacrylate. For example, the vulcanizate may be formed and cured using conventional press cure procedures at about 160° C. to about 200° C. for about 2 to 60 minutes. Post-cure heating may be conducted at about 160° C. to about 200° C. for 15 minutes to several hours. Once crosslinked, the compositions described herein are not thermoplastic, but thermoset. Suitable cure conditions will depend on the particular formulation and are known to those of skill in the art.

The polyamide-filled acrylate polymer compositions of the invention may contain an antioxidant system. In some embodiments, this may be a phosphorus ester antioxidant, a hindered phenolic antioxidant, an amine antioxidant, or a mixture of two or more of these compounds. The proportion of the antioxidant compound in the polyimide-reinforced polyacrylate polymer composition is typically 0.1 to 5 phr, preferably about 0.5 to 2.5 phr. The weight ratio of the phenolic or amine antioxidant to the phosphorus compound in mixtures is about 0.5 to 3, and preferably the ratio is about 1.

The phosphorus ester can be for example, tri(mixed mono- and dinonylphenyl)phosphite, tris(3,5-di-t-butyl-4-hydroxyphenyl phosphate, high molecular weight poly(phenolic phosphonates), and 6-(3,5-di-t-butyl 4-hydroxy)benzyl-6H-dibenz-[c,c][1,2]oxaphosphorin-6-oxide.

Suitable hindered phenolic antioxidants can be, for example 4, 4'-butylidenebis(6-t-butyl-m-cresol), 1,3,5-trimethyl-2,4,6-tris-(3,5-di-t butyl-4-hydroxybenzyl)benzene, 2,6-di-t-butyl-α-dimethylamino-p-cresol and 4,4'-thiobis-(3-methyl-6-t-butylphenol).

Amine antioxidants include, for example, polymerized 2,2,4-trimethyl-1,2-dehydroquinoline; N-phenyl-N'-(p-toluenesulfonyl)-p-phenylenediamine, N,N'-di(naphthyl)-p-phenylenediamine, low temperature reaction product of phenyl (-naphthyl) amine and acetone, and 4,4'-bis(α,α-dimethylbenzyl)diphenylamine.

Preferred antioxidant compositions contain tri(mixed mono- and dinonylphenyl) phosphite mixed with either 4,4'-butylidenebis(6-t-butyl-m cresol) or 4,4'-bis(α,α-dimethylbenzyl)diphenylamine. Particularly preferred antioxidant compositions contain 4,4'-bis(α,α-dimethylbenzyl)diphenylamine (available commercially as Naugard® 445 from Chemtura Corp.). Particularly preferred anti-oxidant compositions include 4-aminodiphenyl amine, at levels up to about 2phr based on the acrylate polymer component. Antioxidants may be added while the one or more amorphous acrylate polymers are melt mixed with the one or more polyamides, or after the blend has cooled.

The vulcanizates prepared from the polyamide-filled acrylate polymer compositions exhibit unusually good resistance to embrittlement during heat aging, as evidenced by a reduction in the amount of decrease in tensile elongation at break following heat aging at 190° C. for one week and a reduction in the increase in Shore A hardness as a result of heat aging. Furthermore, these advantages are gained with no sacrifice in compression set resistance. In most cases, the present invention provides cured compositions having improved compression set resistance when curative levels similar to those used in a conventional compound are utilized. Acrylate polymers comprising high levels of ethylene (30 to 50% by weight), tend to lose elongation at break during heat aging. In these cases, replacement of carbon black with a polyamide filler can decrease the percentage loss of elongation during a one week/190° C. heat aging test by over 50%. This degree of improvement is unusual.

A further embodiment of the invention relates to curable acrylate polymers that include conventional reinforcing fillers in addition to polyamide filler. Such reinforcing fillers are known to those skilled in the art, and include carbon black, amorphous precipitated and fumed silica, crystalline silica such as diatomaceous earth clays such as, kaolin, bentonite, laponite, and montmorillonite, silicate minerals such as magnesium silicate, titanium dioxide, wollastonite, antimony oxide, hydrated alumina, calcium carbonate, barium sulfate, and mixtures of these fillers. The fillers optionally may be modified using organic compounds by known methods to improve either the dispersion in the acrylate polymer or the adhesion to the acrylate polymer. Such methods include treating the filler with organo-silanes or quaternary ammonium compounds. Conventional reinforcing fillers are most preferably added after production of the polyamide-filled acrylate polymer composition, at a mixing temperature less than the melting peak temperature of the polyamide. This process ensures that the filler resides in the acrylate polymer phase.

As has been described herein, it is a basic characteristic of the polyamide-filled compositions of the present invention that they have enhanced heat resistance compared to similar compositions wherein only reinforcing fillers are present. Although the presence of reinforcing fillers is generally detrimental to heat resistance, it has been found that in certain instances cured acrylate polymers having good heat resistance can be formed when particular blends of polyamide filler and one or more reinforcing fillers is present. Such reinforced compositions consist essentially of a) a polymer blend composition comprising i) 40 to 90 wt. % of one or more amorphous acrylate polymers as described herein and ii) 10-60 wt. % of one or more polyamides having a melting peak temperature at least 160° C., the weight percentages being based on the total weight of the one or more acrylate polymers and one or more polyamides, b) a peroxide curative, and c) a reinforcing filler. The amount of reinforcing filler present is an amount which does not result in an excessive increase in Shore A hardness of the cured polyamide-filled acrylate polymer composition. The appropriate amount of reinforcing filler may be easily determined by the following method. Two curable acrylate polymer compounds are prepared, differing only in presence of reinforcing filler. One compound comprises no reinforcing filler, while the other comprises a quantity of reinforcing filler or fillers. The two compounds are cured by exposure to a temperature of 175° C. for 10 minutes in a closed mold at a pressure of at least 10 MPa to form test specimens of thickness 1 to 2.5 mm. The test specimens may optionally be post cured at a temperature up to 190° C. for a time period up to 30 minutes, provided all specimens used in the determination of Shore A hardness increase attributable to the presence of reinforcing filler are press cured and post cured in the same manner. Shore A hardness of the molded and post cured samples is determined at a test temperature of 21° to 25° C. according to ASTM D 2240-06 (1 second reading). Subtracting the Shore A hardness of the unfilled sample from that of the filled sample reveals the Shore A hardness increase attributable to the filler content of the filled sample. Curable compounds comprising polyamide filled acrylate polymers wherein any non-polyamide reinforcing filler content present results in an increase in the Shore A hardness of no more than about 20 points as determined by the previously described method will have the heat resistance that is characteristic of the compositions of the invention.

The vulcanizates prepared from the polyamide-filled acrylate polymer compositions described herein exhibit unusually good resistance to embrittlement during heat aging, as evidenced by a reduction in the amount of decrease in tensile elongation at break following heat aging at 190° C. for one week and a reduction in the increase in Shore A hardness as a result of heat aging. Furthermore, these advantages are gained with no sacrifice in compression set resistance. In most cases, the present invention provides cured compositions having improved compression set resistance when curative levels similar to those used in a conventional compound are utilized. Polyacrylates comprising high levels of ethylene (30 to 50% by weight) tend to lose elongation at break during hot air aging. In this case, replacement of carbon black with a polyamide filler can decrease the percentage loss of elongation during a 3 week aging test at 190° C. by over 50%. This degree of improvement is unusual.

Vulcanizates of the polyamide-filled acrylate polymer compositions prepared by the processes described herein can be used in a wide variety of industrial applications, for production of articles including wire and cable covering, ignition wire jacketing, spark plug boots, hoses, belts, miscellaneous molded boots, seals and gaskets. Hose applications include turbo diesel air cooler hoses, transmission oil cooler hoses, power steering hoses (low pressure), air conditioning hoses, air ducts, fuel line covers, and vent hoses.

Examples of seals include engine head cover gaskets, oil pan gaskets, oil seals, lip seal packings, O-rings, transmission seal gaskets, seal gaskets for a crankshaft or a camshaft, valve stem seals, power steering seals, and belt cover seals.

Automotive tubing applications include axle vent tubing, PCV tubing and other emission control parts. The vulcanizates are also useful for manufacture of crankshaft torsional dampers where high damping over a broad temperature range is needed under high compressive and shear strains. The vulcanizates also can be used to prepare noise management parts such as grommets.

The invention is further illustrated by the following examples wherein all parts are by weight unless otherwise indicated.

EXAMPLES

Materials

Polyacrylate Polymer
A1 Copolymer having copolymerized units of 38 wt. % ethylene (65.3 mol %) and 62 wt. % methyl acrylate, Mooney viscosity (ML1+4, 100° C.) of 22.

A2 Copolymer of ethylene and methyl acrylate having 55 wt % ethylene (71.5 mol %) and 45 wt % methyl acrylate, Mooney viscosity (ML1+4, 100 C) of 31.

A3 Copolymer of methyl acrylate and ethylene comprising 55 wt % copolymerized methyl acrylate units, 43 wt % ethylene units (about 70 mol %) and approximately 2 weight % (about 0.6 mol %) copolymerized units of monoethyl maleate, Mooney viscosity (ML 1+4) at 100° C. of 33.

A4 Copolymer of ethyl acrylate, butyl acrylate, and ethylene comprising approximately 67.8% by weight copolymerized units of ethyl acrylate, approximately 29.8 wt. % copolymerized units of butyl acrylate, about 1.5% copolymerized units of ethylene (about 5.5 mole %), and approximately 0.9% (about 0.5 mol %) by weight copolymerized units of a carboxylic acid containing cure site monomer, Mooney viscosity (ML 1+4) at 100° C. of 46.

A5 Acrylate co-polymer comprising a chlorine cure site and having a Mooney viscosity (ML1+4. 100 C) of 32. Available from Zeon Chemcials L.P. as HyTemp® AR72LF.

Polyamides

P1 Polyamide 6, inherent viscosity of 1.24 dL/g, melting peak temperature approximately 220° C., available from BASF Corporation as Ultramid® B33.

P2 Polyamide 6, inherent viscosity of 1.450 dL/g, melting peak temperature approximately 220° C., available from BASF as Ultramid® B40.

P3 Polyamide copolymer comprising copolymerized units of hexamethylene diamine, adipic acid, and terephthalic acid, melting peak temperature of approximately 262° C., and inherent viscosity of 0.892 dL/g.

P4 Polyamide 6/10, having a melting point of approximately 225° C. and inherent viscosity of 1.167 dL/g.

P5 Polyamide 6, inherent viscosity of 0.867 dL/g, melting point 220° C., available from BASF as Ultramid® B24

P6 Amorphous polyamide with a glass transition midpoint of about 125° C.

P7 Polyamide 6, inherent viscosity of 0.978 dL/g, melting peak temperature of about 220° C., available from BASF as Ultramid® B27

Other Ingredients

Peroxide: mixture of the para and meta isomers of an α,α'-bis(tert-butylperoxy)-diisopropylbenzene, 40% peroxide active ingredient on kaolin clay carrier, Vulcup® 40KE, available from Arkema Inc.

Coagent: N,N'-(m-phenylene)dimaleimide, HVA-2, available from DuPont. Carbon black: N550 grade, Sterling® SO carbon black, available from Cabot Corp.

Antioxidant (AO): Naugard® 445 antioxidant, available from Chemtura Corp.

Process aid: Vanfre® VAM organic phosphate ester, available from RT Vanderbilt.

Test Methods

Mooney viscosity: ASTM D1646, ML 1+4, 100° C.

Cure response: Measured per ASTM D2084-07 using an MDR 2000 from Alpha Technologies operating at 0.5° arc. Test conditions of 190° C. for 15 minutes. ML refers to the minimum torque value measured during the test, while MH refers to the maximum torque value attained after ML O-ring Compression Set: ASTM D395B, 25% compression, 150° C./70 hour test, using AS568A-214 o-rings press cured 10 minutes at 190° C. Data reported are the median values of three samples.

ISO compression set: ISO 815-1:2008, 25% compression, 70 hour/150° C. test, using type B molded buttons prepared using press cure conditions of 175° C. for 10 minutes followed by a 30 minute post cure in a hot air oven at 175° C. Data reported are the median values of 3 specimens.

Tensile properties: ASTM D412-06, die C. Samples cut from 2.0 mm thick plaques press cured and optionally post cured as specified. Data reported are the median values of 3 specimens. Stress at elongations of 25%, 50%, 100%, and 200% are listed as M25, M50, M100, and M200, respectively. The rupture properties of tensile strength and elongation are indicated as Tb and Eb, (tensile at break and elongation at break, respectively).

Shore A hardness: measured using 6 mm thick samples composed of 2 mm thick plies, the plies having been press cured and optionally post cured as specified, aged for 24 hours at ambient conditions of 23° C. and 50% relative humidity, per ASTM D2240-05 test method, using a type 2 operating stand. The median value of 5 readings is reported.

Heat aging: Tensile specimens, prepared as described above are hung in a hot air oven for the specified time and temperature. The specimens are conditioned at ambient conditions of 23° C. and 50% RH for at least 24 hours before tensile properties are measured.

Green strength: Measured per ASTM D6746-10 on the uncured blend of acrylate rubber and polyamide, prior to the addition of conventional fillers, curatives, plasticizers, or other ingredients. The blend is sheeted on a roll mill to about 2.5 mm thickness, then at molded in a cavity of dimensions 2 mm×76.2 mm×152.4 mm. Molding conditions are 100° C. for 5 minutes under 30 tons of pressure, followed by 30 minutes of cooling at room temperature out of the press between metal sheets. ASTM D412 Die C tensile specimens are then cut from the molded plaque in a direction parallel to the grain of the milled sheet. Median yield stress is reported.

Inherent viscosity of polyamides: Measured per D2857-95, using 96% by weight sulfuric acid as a solvent at a test temperature of 25° C. Samples were dried for 12 hours in a vacuum oven at 80° C. before testing.

Crystallization peak temperature: Measured in accordance with ASTM D3418-08.

Example 1

The compositions shown in Table 1, wherein all amounts are in weight percent, were prepared using a Haake Rheocord® mixer. After adding the polymers to the heated mixing bowl, the blends were mixed for three minutes at 50 rpm once the polymer melt temperature reached 235° C. Polyamides were dried 4 hours at 120° C. in a vacuum oven prior to being melt blended with polyacrylate copolymer in the mixing bowl. After mixing, the blends were cooled to about 25° C. before further processing.

TABLE 1

|  | Composition | | |
| --- | --- | --- | --- |
|  | B1 | B2 | B3 |
| A1 | 75 | 75 | 75 |
| P1 | 25 |  |  |
| P2 |  | 25 |  |
| P3 |  |  | 25 |
| Green strength (MPa) | 0.3 | 0.3 | 0.2 |
| Amine-reactive cure site (mol %) | 0 | 0 | 0 |

Curable compositions E1-E3 and CE1 were prepared by mixing the ingredients listed in Table 2 on a roll mill. E1-E3 contained polyamide as a reinforcing filler and CE1 contained carbon black as a reinforcing filler. The designation "phr" indicates parts per hundred of amorphous acrylate polymer in the compound.

TABLE 2

| Composition | E1 phr | E2 phr | E3 phr | CE1 phr |
|---|---|---|---|---|
| B1 | 133.33 | | | |
| B2 | | 133.33 | | |
| B3 | | | 133.33 | |
| A1 | | | | 100 |
| Peroxide | 5 | 5 | 5 | 5 |
| Coagent | 2 | 2 | 2 | 2 |
| Antioxidant | 1 | 1 | 1 | 1 |
| Carbon Black | | | | 45 |
| Cure Response | | | | |
| ML (dN-m) | 0.2 | 0.2 | 0.1 | 0.2 |
| MH (dN-m) | 7.0 | 7.0 | 6.7 | 9.1 |
| Tensile Properties and Shore A Hardness After Press Cure (3 min/190 C.) and Post Cure (30 min/190° C.) | | | | |
| Shore A (pts) | 53 | 51 | 51 | 66 |
| M50 (MPa) | 1.1 | 1 | 0.9 | 1.8 |
| M100 (MPa) | 2.2 | 1.9 | 1.8 | 3.7 |
| M200 (MPa) | 6.2 | 5.9 | 5.8 | 10.7 |
| Tb (MPa) | 7 | 8.2 | 6.2 | 15.7 |
| Eb (%) | 220 | 255 | 210 | 285 |
| Tensile Properties and Shore A Hardness After 1 Week at 190° C. | | | | |
| Shore A (pts) | 49 | 49 | 48 | 68 |
| M50 (MPa) | 0.7 | 0.7 | 0.6 | |
| M100 (MPa) | 1.3 | 1.3 | 1.1 | |
| M200 (MPa) | 4.1 | 4.2 | 4.1 | |
| Tb (MPa) | 6.4 | 7.2 | 6.1 | 3.3 |
| Eb (%) | 270 | 310 | 245 | 50 |
| Tensile Properties and Shore A Hardness After 2 Weeks at 190° C. | | | | |
| Shore A (pts) | 45 | 44 | 44 | 82 |
| M50 (MPa) | 0.6 | 0.6 | 0.6 | |
| M100 (MPa) | 1.2 | 1.2 | 1.5 | |
| Tb (MPa) | 3.4 | 2.4 | 2.3 | 2.6 |
| Eb (%) | 170 | 145 | 120 | 2 |
| Change in Shore A Hardness After 2 Weeks at 190° C. | | | | |
| (points) | −8 | −7 | −7 | 16 |
| O-ring Compression Set, molded 10 min at 190° C. | | | | |
| (%) | 11 | 14 | 14 | 19 |

The results shown in Table 2 indicate that E1-E3 cure well. After press cure and post cure, E1-E3 exhibit significantly lower Tb than CE1, and slightly lower Eb. After one week of heat aging at 190° C., E1-E3 exhibit at least twice the Tb and five times greater Eb than CE1. After two weeks at 190° C., CE1 has become hard and brittle, exhibiting a gain of 16 points in Shore A hardness and an Eb of 2%. After two weeks at 190° C., Eb values for E1-E3 are all significantly greater than 100%, and E1-E3 specimens have become softer as indicated by a loss of 7 to 8 points in Shore A hardness. E1-E3 display better compression set resistance than CE1.

Example 2

The compositions shown in Table 3 were prepared using a Haake Rheocord® mixer. After adding all ingredients to the mixer, the blends were mixed for 3 minutes at 100 rpm once the polymer temperature reached 225° C. Final melt temperatures ranged from 245° C. to 250° C. The polymers were not dried prior to mixing. After mixing, the blends were cooled to about 25° C. before further processing.

TABLE 3

| | Composition | | | | | |
|---|---|---|---|---|---|---|
| | B4 % | B5 % | B6 % | B7 % | B8 % | B9 % |
| A2 | 59.7 | 56.7 | 53.7 | 44.8 | 99.5 | 74.6 |
| A3[1] | | 3.0 | 6.0 | 14.9 | | 24.9 |
| P4 | 39.8 | 39.8 | 39.8 | 39.8 | | |
| Antioxidant | 0.5 | 0.5 | 0.5 | 0.5 | 0.5 | 0.5 |
| Green strength (MPa) | 0.6 | 0.6 | 0.6 | 1.1 | 0.2 | 0.2 |
| Amine-reactive cure site (mol %) | 0 | 0.03 | 0.06 | 0.16 | 0 | 0.16 |

[1]Contains copolymerized units of monoethyl maleate, an amine reactive cure site monomer Compositions B4-B7 comprise blends of acrylate polymer and polyamide, whereas B8 and B9 do not contain polyamide. The level of amine reactive cure site in the blends comprising polyamide ranges from zero to 0.16 mol %. The blends without polyamide encompass the same range of cure site. All the blends in Table 3 exhibit a green strength of less than 2 MPa, indicating the acrylate polymer comprises the continuous phase.

Compositions B4-B9 were compounded to produce curable compositions E4-E7, CE2, and CE3 as shown in Table 4. Compositions B8 and B9, lacking polyamide reinforcement, contain conventional carbon black to form comparative compositions CE2 and CE3. Compositions E4-E7 use solely polyamide as a filler.

TABLE 4

| | Composition | | | | | |
|---|---|---|---|---|---|---|
| | E4 phr | E5 Phr | E6 Phr | E7 phr | CE2 Phr | CE3 phr |
| B4 | 167.5 | | | | | |
| B5 | | 167.5 | | | | |
| B6 | | | 167.5 | | | |
| B7 | | | | 167.5 | | |
| B8 | | | | | 100 | |
| B9 | | | | | | 100 |
| Peroxide | 4 | 4 | 4 | 4 | 4 | 4 |
| Carbon black | | | | | 40 | 40 |
| Cure Response | | | | | | |
| ML (dN-m) | 0.4 | 0.6 | 0.7 | 1.3 | 0.3 | 0.5 |
| MH (dN-m) | 10.5 | 10.8 | 10.9 | 12.1 | 7.8 | 8 |
| Tensile properties and Shore A after press cure 175° C. for 10 min | | | | | | |
| Shore A | 66 | 66 | 67 | 70 | 54 | 59 |
| M50 (MPa) | 3.3 | 2.9 | 2.6 | 5.1 | 1.1 | 1.3 |
| M100 (MPa) | 5.9 | 6 | 5.5 | 10.5 | 1.8 | 2.2 |
| M200 (MPa) | 9.6 | 11.6 | 11.7 | 18.2 | 6 | 6 |
| Tb (MPa) | 9.9 | 12.2 | 13.9 | 18.9 | 18.6 | 18.6 |
| Eb (%) | 215 | 215 | 250 | 215 | 435 | 570 |
| Tensile properties and Shore A after 1 week at 190° C. | | | | | | |
| Shore A | 57 | 55 | 55 | 60 | 76 | 79 |
| M50 (MPa) | 2.1 | 1.4 | 1.3 | 2.7 | Too Brittle to Test | too brittle to test |
| M100 (MPa) | 2.6 | 2.6 | 2.4 | 5.3 | | |
| M200 (MPa) | | 5.8 | 5.7 | | | |
| Tb (MPa) | 3.5 | 7.1 | 8.4 | 9.2 | | |
| Eb (%) | 178 | 264 | 298 | 185 | | |
| ISO compression set | | | | | | |
| Buttons molded 10 min at 175° C., post cured 30 min at 175° C. | | | | | | |
| % | 27 | 25 | 26 | 36 | 30 | 34 |

The results in Table 4 show that the compositions E4-E7 exhibit dramatically better heat aging resistance than CE2 or CE3, both of which experienced an increase in Shore A hardness of over 20 points, and became so weak and brittle that they could not be accurately tested for tensile properties. As the amine reactive cure site level increases from 0 to 0.16 mol % in the Example compositions, tensile strength after press curing increases from about 10 to 19 MPa. Compositions E5 and E6 have low but non-zero levels of amine reactive cure site, and display the best compression set resistance and tensile strength retention upon heat aging 1 week at 190° C.

Example 3

Compositions B10-B12 were mixed on a Haake Rheocord® mixer following the method of Example 2. Composition B10 contains polyamide P5, which has a low inherent viscosity. B10 is stiff and barely could be milled into a slab for molding a plaque to measure green strength. No further compounding could be conducted on B10 to produce a curable composition. Composition B11 contains P2, which has a high inherent viscosity, yielding an easily workable blend. Composition B12 comprises an amorphous polyamide. Although the blend has a low green strength and was easily workable, the polyamide will become fluid at the cure temperature of the acrylate elastomer.

TABLE 5

|  | Composition | | |
| --- | --- | --- | --- |
|  | B10 % | B11 % | B12 % |
| A2 | 56.715 | 56.715 | 56.715 |
| A3[1] | 2.985 | 2.985 | 2.985 |
| P2 |  | 39.8 |  |
| P5 | 39.8 |  |  |
| P6 |  |  | 39.8 |
| Antioxidant | 0.5 | 0.5 | 0.5 |
| Green strength (MPa) | 2.9 | 0.4 | 0.5 |
| amine-reactive cure site (mol %) | 0.03 | 0.03 | 0.03 |

[1]Contains copolymerized units of monoethyl maleate, an amine reactive cure site monomer Compositions B11 and B12 are compounded with peroxide curative to produce E8 and CE4, as shown in Table 6. Compared to CE4, E8 displays superior cure response, initial and heat aged properties, and compression set resistance.

TABLE 6

| Composition | E8 phr | CE4 phr |
| --- | --- | --- |
| B11 | 167.5 |  |
| B12 |  | 167.5 |
| Peroxide | 4 | 4 |
| Cure response | | |
| ML (dN-m) | 0.5 | 0.4 |
| MH (dN-m) | 8.4 | 3.8 |
| Shore A and tensile properties after press cure 175° C. for 10 min | | |
| Shore A | 59 | 60 |
| M25 (MPa) | 0.9 | 0.9 |
| M50 (MPa) | 1.3 | 1.4 |
| M100 (MPa) | 2.5 | 2.8 |
| Tb (MPa) | 15.1 | 10 |
| Eb (%) | 340 | 320 |
| Shore A and tensile properties after press cure 1 week/190° C. heat aging | | |
| Shore A | 51 | 50 |
| M25 (MPa) | 0.5 | 0.4 |
| M50 (MPa) | 0.7 | 0.6 |

TABLE 6-continued

| Composition | E8 phr | CE4 phr |
| --- | --- | --- |
| M100 (MPa) | 1 | 1.2 |
| Tb (MPa) | 9.1 | 4.1 |
| Eb (%) | 430 | 270 |
| Change in properties heat aged - press cured | | |
| Shore A (pts) | −8 | −10 |
| Tb (%) | −40 | −59 |
| Eb (%) | 26 | −16 |
| Buttons molded 10 min at 175 C., with 30 min 175° C. post cure, ISO compression set | | |
| % | 21 | 83 |

Comparative Example

Compositions B13 and B14 were mixed according to the method of Example 2, and CE5 and CE6 were compounded with curative to match E4-E7 of example 2. Blends B13 and B14 contain A4 and A5 respectively, neither of which comprise a cure site suitable for peroxide curing, nor sufficient ethylene to inhibit R-scission from the peroxide free radicals. Both CE5 and CE6 exhibit poor cure response, insufficient to mold articles.

TABLE 7

| Composition | B13 % | B14 % |
| --- | --- | --- |
| A4[1] | 70 |  |
| A5 |  | 70 |
| P2 | 30 | 30 |
| Compounds | CE5 phr | CE6 phr |
| B13 | 142.85 |  |
| B14 |  | 142.85 |
| Peroxide | 4 | 4 |
| Antioxidant | 0.35 | 0.35 |
| Cure response | | |
| ML (dN-m) | 0.6 | 0.7 |
| MH (dN-m) | 1.8 | 1.9 |
| MH − ML (dN-m) | 1.2 | 1.2 |

[1]Contains approximately 0.9% (about 0.5 mol %) by weight copolymerized units of a carboxylic acid containing cure site monomer, an amine-reactive cure site monomer Example 4

Composition B15 was produced on a 25 mm Berstorff® twin screw extruder operating at a screw speed of 150 rpm and output of 12 kg/hour. Polymer melt temperature was 282° C. The blend was extruded onto a water cooled belt, and cooled to room temperature before further processing. The composition and green strength of blend B15 is shown in Table 8.

TABLE 8

|  | Composition B15 % |
| --- | --- |
| A1 | 80 |
| P7 | 20 |
| Green Strength (MPa) | 0.9 |
| Crystallization peak temperature (° C.) | 177 |

Composition B15 was mixed on a roll mill with ingredients as shown in Table 9 to produce curable compositions E9-E11 and CE5-CE10. Composition E9 comprises polyamide and no carbon black, while compounds E10, E11, and CE5 comprise a mixture of polyamide and carbon black. Compounds CE6-CE9 comprise only carbon black filler, while CE10 comprises no filler. CE6-CE10 permit calculation of the increase in Shore A hardness that can be attributed to carbon black in the compound. Heat aging results of E9-E11, CE5, and CE6 show that when carbon black increases the Shore A hardness of the compound by about 20 points or less of a polyimide-filled compound, retention of tensile strength and elongation during heat aging is superior to compounds that derive more than about 20 points Shore A hardness from carbon black.

Shore A hardness of the E12-E14 series. CE12-CE14 comprise acrylate copolymer A1 and zero to 24 phr silica, to allow determination of the Shore A increase attributable to silica in compounds E13 and E14. The silica in E13 and E14 contributes 8 and 19 points Shore A hardness, respectively, to the press cured composition. Composition CE9 obtains 36 points Shore A hardness from silica.

Results in Table 10 indicate that compositions E12-E14, which rely on silica filler for less than about 20 points Shore A hardness, exhibit good tensile strength (Tb) and elongation to break (Eb) after one week at 190° C. hot air aging. Composition CE11 became extremely hard, gaining 22 points Shore A hardness during the hot air aging, and was too brittle to test for tensile properties.

TABLE 9

| | E9 phr | E10 Phr | E11 phr | CE5 phr | CE6 phr | CE7 phr | CE8 phr | CE9 phr | CE10 phr |
|---|---|---|---|---|---|---|---|---|---|
| B15 | 125 | 88.24 | 55.55 | 29.41 | | | | | |
| A1 | | 29.41 | 55.55 | 88.24 | 100 | 100 | 100 | 100 | 100 |
| Peroxide | 5 | 5 | 5 | 5 | 5 | 5 | 5 | 5 | 5 |
| Coagent | 1 | 1 | 1 | 1 | 1 | 1 | 1 | 1 | 1 |
| Antioxidant | 1 | 1 | 1 | 1 | 1 | 1 | 1 | 1 | 1 |
| Process aid | 0.5 | 0.5 | 0.5 | 0.5 | 0.5 | 0.5 | 0.5 | 0.5 | 0.5 |
| Carbon black | | 11 | 23 | 34 | 45 | 34 | 23 | 11 | |
| Cure Response | | | | | | | | | |
| ML (dN-m) | 0.3 | 0.3 | 0.3 | 0.3 | 0.4 | 0.3 | 0.2 | 0.2 | 0.1 |
| MH (dN-m) | 7.6 | 7.6 | 8 | 7.3 | 8.6 | 6.9 | 5.5 | 4.1 | 3.2 |
| Shore A hardness and tensile properties after press cure 175° C. for 10 min | | | | | | | | | |
| Shore A | 59 | 59 | 60 | 60 | 65 | 59 | 48 | 35 | 27 |
| M25 (dN-m) | 1.47 | 1 | 1.1 | 1 | 1.2 | 0.82 | 0.6 | 0.43 | 0.31 |
| M50 (dN-m) | 3.3 | 2.1 | 2.1 | 1.7 | 1.9 | 1.2 | 0.9 | 0.6 | 0.4 |
| M100 (dN-m) | 7.4 | 5.6 | 5.2 | 4.1 | 4.4 | 2.5 | 1.5 | 0.9 | 0.6 |
| Tb (dN-m) | 10.8 | 10.8 | 13.6 | 16 | 16.4 | 14 | 11.6 | 2.8 | 1.1 |
| Eb (%) | 175 | 205 | 265 | 350 | 300 | 330 | 350 | 245 | 275 |
| Shore A points attributable to carbon black | | | | | | | | | |
| Points | 0 | 8 | 21 | 32 | 38 | 32 | 21 | 8 | 0 |
| Shore A hardness and tensile properties after 1 week at 190° C. hot air aging | | | | | | | | | |
| Shore A | 57 | 57 | 63 | 63 | 70 | nm | nm | nm | nm |
| M25 (dN-m) | 1.1 | 0.8 | 1 | 1 | 2.3 | | | | |
| M50 (dN-m) | 1.8 | 1.4 | 1.6 | 1.5 | 3.4 | | | | |
| M100 (dN-m) | 3.1 | 2.8 | 3.3 | 2.8 | | | | | |
| Tb (dN-m) | 6.8 | 6.7 | 7.3 | 5.8 | 3.8 | | | | |
| Eb (%) | 255 | 225 | 210 | 200 | 60 | | | | |
| Change in properties due to hot air aging | | | | | | | | | |
| Shore A (pts) | −2 | −2 | 3 | 3 | 5 | | | | |
| Tb (%) | −37 | −38 | −46 | −64 | −77 | | | | |
| Eb (%) | 46 | 10 | −21 | −43 | −80 | | | | | nm = not measured

Example 5

The composition of polyamide-filled acrylate copolymer B15 is described in Example 4. The composition and physical properties of E12-E14 and CE11-CE14 are shown in Table 10. Compound E12 comprises polyamide filler P7, while E13 and E14 dilute B15 with increasing levels of A1, while introducing silica filler to maintain an approximately constant Shore A hardness in the cured compositions. The P7 content of the polymer component of E12, E13, and E14 is 20 wt. %, 15 wt. % and 10 wt. % respectively. CE11 comprises acrylate copolymer A1 and 45 phr silica, so as to approximate the

TABLE 10

| | E12 phr | E13 phr | E14 phr | CE11 phr | CE12 phr | CE13 phr | CE14 phr |
|---|---|---|---|---|---|---|---|
| B15 | 125 | 88.24 | 55.55 | | | | |
| A1 | | 29.41 | 55.55 | 100 | 100 | 100 | 100 |
| Peroxide | 5 | 5 | 5 | 5 | 5 | 5 | 5 |
| Coagent | 2 | 2 | 2 | 2 | 2 | 2 | 2 |

TABLE 10-continued

| | E12 phr | E13 phr | E14 phr | CE11 phr | CE12 phr | CE13 phr | CE14 phr |
|---|---|---|---|---|---|---|---|
| Composition | | | | | | | |
| Antioxidant | 1 | 1 | 1 | 1 | 1 | 1 | 1 |
| Process aid | 0.5 | 0.5 | 0.5 | 0.5 | 0.5 | 0.5 | 0.5 |
| Silica | | 12 | 24 | 45 | 12 | 24 | |
| Cure response | | | | | | | |
| ML (dN-m) | 0.3 | 0.6 | 1.8 | 4.3 | 0.2 | 0.7 | 0.1 |
| MH (dN-m) | 8.2 | 10 | 16.3 | 28.4 | 5.1 | 11.1 | 3.4 |
| Shore A hardness and tensile properties after press cure at 175 C./10 minutes | | | | | | | |
| Shore A | 61 | 63 | 67 | 69 | 41 | 52 | 33 |
| M25 (MPa) | 2.5 | 1.72 | 1.63 | 1.43 | 0.45 | 0.75 | 0.27 |
| M50 (MPa) | 5.7 | 3.2 | 2.6 | 1.6 | 0.6 | 0.9 | 0.4 |
| M100 (MPa) | 10.5 | 6 | 4.6 | 2.1 | 0.9 | 1.3 | 0.6 |
| Tb (MPa) | 13 | 11.6 | 12 | 15.2 | 2.5 | 10.4 | 1.5 |
| Eb (%) | 155 | 265 | 375 | 535 | 265 | 475 | 290 |
| Shore A hardness points attributable to silica | | | | | | | |
| | 0 | 8 | 19 | 36 | 8 | 19 | 0 |
| Shore A hardness and tensile properties after press cure at one week at 190 C. hot air aging | | | | | | | |
| Shore A | 59 | 67 | 78 | 91 | | | |
| M25 | 1.8 | 2.1 | 2.7 | too | | | |
| M50 | 2.8 | 3 | 3.6 | brittle | | | |
| M100 | 4.8 | 4.7 | 5.2 | to | | | |
| Tb | 8.4 | 9.4 | 10.6 | test | | | |
| Eb | 225 | 290 | 305 | | | | |
| Change in properties due to hot air aging | | | | | | | |
| Shore A (pts) | −2 | 4 | 11 | 22 | | | |
| Tb (%) | −35 | −19 | −12 | | | | |
| Eb (%) | 45 | 9 | −19 | | | | |

What is claimed is:

1. A curable polyamide-filled acrylate polymer composition comprising
A. a polymer blend composition comprising
   1. 40 to 90 wt. % of one or more amorphous acrylate polymers comprising at least 50 wt. %, based on the total weight of the amorphous acrylate polymer, of polymerized units of at least one monomer having the structure

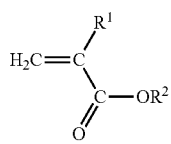

Where $R^1$ is H or $C_1$-$C_{10}$ alkyl and $R^2$ is $C_1$-$C_{12}$ alkyl, $C_1$-$C_{20}$ alkoxyalkyl, $C_1$-$C_{12}$ cyanoalkyl, or $C_1$-$C_{12}$ fluoroalkyl; and 2. 10-60 wt. % of one or more polyamides having a melting peak temperature of at least 160° C.;
wherein i) the one or more polyamides are present as a discontinuous phase in the polymer blend composition, ii) the green strength of the polymer blend composition is less than about 2 MPa, as determined in accordance with ASTM D6746-10, and iii) the weight percentages of the one or more amorphous acrylate polymers and the one or more polyamides are based on the combined weight of the one or more amorphous acrylate polymers and one or more polyamides in the polymer blend composition; and
B. a peroxide curative.

2. A curable polyamide-filled acrylate polymer composition of claim 1 wherein the one or more amorphous acrylate polymers of the polymer blend composition comprise polymerized units of at least one monomer selected from the group consisting of alkyl acrylates, alkyl methacrylates, alkoxyalkyl acrylates, alkoxyalkyl methacrylates, and mixtures of two or more thereof.

3. A composition of claim 2 wherein the monomer is an alkyl acrylate selected from the group consisting of methyl acrylate, ethyl acrylate, and butyl acrylate.

4. A curable polyamide-filled acrylate polymer composition of claim 1 wherein at least one of the one or more amorphous acrylate polymers of the polymer blend composition is substantially free of a cure site monomer selected from the group consisting of unsaturated carboxylic acids, anhydrides of unsaturated carboxylic acids, unsaturated epoxides, and mixtures of two or more thereof.

5. A curable polyamide-filled acrylate polymer composition of claim 1 wherein at least one of the one or more amorphous acrylate polymers of the polymer blend composition additionally comprises copolymerized units of an olefin.

6. A composition of claim 5 wherein the olefin is ethylene.

7. A curable polyamide-filled acrylate polymer composition of claim 1 wherein at least one of the one or more amorphous acrylate polymers of the polymer blend composition comprises copolymerized units of a cure site monomer.

8. A curable polyamide-filled acrylate polymer composition of claim 7 wherein the cure site monomer is selected from the group consisting of unsaturated carboxylic acids, anhydrides of unsaturated carboxylic acids, unsaturated epoxides, and mixtures of two or more thereof and the weight average of mole percent of polymerized cure site monomer in the one or more acrylate polymers is from about 0.03 to 0.3 mol %.

9. A curable polyamide-filled acrylate polymer composition of claim 1 wherein at least one of the one or more polyamides of the polymer blend composition is selected from the group consisting of i) polyamides formed by ring opening or condensation of aminocarboxylic acids and ii) polyamides having a melting peak temperature of less than 270° C. and an amine end group concentration of 60 meq/kg or less.

10. A curable polyamide-filled acrylate polymer composition of claim 1 wherein at least one of the one or more polyamides of the polymer blend composition has an inherent viscosity greater than 0.9 dig as determined in accordance with ASTM D2857-95, using 96% by weight sulfuric acid as a solvent at a test temperature of 25° C.

11. A curable polyamide-filled acrylate polymer composition of claim 1 wherein the polymer blend composition comprises 50 to 80 weight percent of one or more amorphous acrylate polymers and 20 to 50 weight percent of one or more polyamides, based on the total weight of the one or more amorphous acrylate polymers and one or more polyamides.

12. A curable polyamide-filled acrylate polymer composition of claim 1 wherein the polymer blend composition comprises 55 to 70 weight percent of one or more amorphous acrylate polymers and 30 to 45 weight percent of one or more polyamides based on the total weight of the one or more amorphous acrylate polymers and one or more polyamides.

13. A curable polyamide-filled acrylate polymer composition of claim 1 wherein the peroxide curative comprises a peroxide and optionally a coagent.

14. A composition of claim 13 wherein the peroxide is selected from the group consisting of dicumyl peroxide, 2,5-bis(t-butylperoxy)-2,5-dimethylhexane; and α',α'-bis(t-butylperoxy)-diisopropylbenzene.

15. A curable polyamide-filled acrylate polymer composition of claim 1 additionally comprising at least one material selected from the group consisting of reinforcing fillers, antioxidants, accelerators, plasticizers, process aids, waxes, pigments, and colorants.

16. A composition of claim 15 wherein the material is an antioxidant selected from the group consisting of aryl amines, phenolics, imidazoles, phosphites, phosphorus esters, hindered phenolics and mixtures of two or more thereof.

17. A curable polyamide-filled acrylate polymer composition of claim 1 wherein the green strength of the polymer blend composition is less than 1 MPa.

18. A curable polyamide-filled acrylate polymer composition of claim 1 wherein the polymer blend composition has a Mooney viscosity of less than 120 as determined according to ASTM D1646, ML 1+4, at 100° C.

19. A curable polyamide-filled acrylate polymer composition of claim 1 having a cure response MH-ML of at least 2.5 dN-m as determined according to ASTM D5289-07a using an MDR 2000 from Alpha Technologies operating at 0.5° arc and test conditions of 190° C. for 15 minutes, where ML refers to the minimum torque value measured and MH refers to the maximum torque value attained after the measurement of ML.

20. A curable polyamide-filled acrylate polymer composition of claim 1 wherein at least one of the one or more polyamides comprises nylon 6.

* * * * *